United States Patent
Ishida et al.

(10) Patent No.: US 9,160,016 B2
(45) Date of Patent: Oct. 13, 2015

(54) FUEL CELL

(75) Inventors: Kentaro Ishida, Wako (JP); Akihiro Matsui, Wako (JP); Narutoshi Sugita, Wako (JP); Hayato Kaji, Wako (JO)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 13/347,595

(22) Filed: Jan. 10, 2012

(65) Prior Publication Data

US 2012/0178004 A1  Jul. 12, 2012

(30) Foreign Application Priority Data

Jan. 12, 2011  (JP) .................................. 2011-004161

(51) Int. Cl.
*H01M 8/06* (2006.01)
*H01M 8/10* (2006.01)
*H01M 8/04* (2006.01)
*H01M 8/02* (2006.01)

(52) U.S. Cl.
CPC ........ *H01M 8/04156* (2013.01); *H01M 8/0271* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 7,531,266 B2 | 5/2009 | Sano et al. | |
| 2006/0216572 A1* | 9/2006 | Yoshida et al. | 429/38 |
| 2006/0286426 A1 | 12/2006 | Kikuchi et al. | |
| 2007/0111083 A1* | 5/2007 | Kikuchi et al. | 429/38 |
| 2010/0086820 A1* | 4/2010 | Owejan et al. | 429/30 |

FOREIGN PATENT DOCUMENTS

| JP | 3123992 B2 | 5/2000 |
| JP | 2002-343382 | 11/2002 |
| JP | 2006-351323 | 12/2006 |
| JP | 2007-227276 | 9/2007 |
| JP | 2008-059998 | 3/2008 |
| JP | 2008-078111 | 4/2008 |
| JP | 2008-198393 | 8/2008 |

OTHER PUBLICATIONS

Chinese Office Action for corresponding CN Application No. 201110419965.0, Nov. 27, 2013.

(Continued)

*Primary Examiner* — Patrick Ryan
*Assistant Examiner* — Christopher Domone
(74) *Attorney, Agent, or Firm* — Mori & Ward, LLP (57) ABSTRACT

A fuel cell includes a membrane-electrode assembly and a separator. The membrane-electrode assembly has an electrolyte and a pair of electrodes that are disposed on respective sides of the electrolyte. The membrane-electrode assembly and the separator are stacked in a stacking direction. A reaction surface of the membrane-electrode assembly is in a vertical direction along a direction of gravity and has a shape having a longer dimension in a horizontal direction. The fuel cell is provided with a reactant gas passage to allow a reactant gas to flow along a longitudinal direction of the reaction surface. The reactant gas is an oxidant gas or a fuel gas. A drain channel to allow product water from the reactant gas passage to be drained away is disposed between the membrane-electrode assembly and the separator and under the reaction surface in the direction of gravity.

20 Claims, 11 Drawing Sheets

(56) References Cited

OTHER PUBLICATIONS

Japanese Office Action for corresponding JP Application No. 2011-004161, Jun. 20, 2014.

Japanese Office Action for corresponding JP Application No. 2011-004161. Sep. 12, 2014.

Japanese Office Action for corresponding JP Application No, 2011-004161, Jan. 6, 2015.

* cited by examiner

FUEL CELL

CROSS-REFERENCE TO RELATED APPLICATIONS

The present application claims priority under 35 U.S.C. §119 to Japanese Patent Application No. 2011-004161, filed Jan. 12, 2011, entitled "Fuel Cell." The contents of this application are incorporated herein by reference in their entirety.

BACKGROUND OF THE INVENTION

1. Field of the Invention

The present invention relates to a fuel cell.

2. Discussion of the Background

For example, in a solid polymer electrolyte fuel cell, a membrane-electrode assembly (MEA) is sandwiched between a pair of separators, the membrane-electrode assembly including a polymer electrolyte membrane formed of a polymer ion exchange membrane, and the anode and cathode electrodes that are disposed on the respective sides of the polymer electrolyte membrane. In general, a plurality of fuel cells is stacked together to form a fuel cell stack, and in addition to stationary use, the fuel cell stack is incorporated into a fuel cell vehicle to be used as an in-vehicle fuel cell system.

The above-mentioned fuel cell is provided with a fuel gas passage for passing a fuel gas to the anode electrode (hereinafter, referred to as a reactant gas passage), and an oxidant gas passage for passing an oxidant gas to the cathode electrode (hereinafter, also referred to as a reactant gas passage), within the respective surfaces of the separators. In addition, a cooling medium passage for passing therethrough a cooling medium is provided in the longitudinal direction of the separators, for each power generation cell or for each set of a plurality of power generation cells.

In this type of fuel cell, in order to secure a favorable ionic conduction property, the electrolyte membrane needs to be maintained at a certain water content. For this reason, a system is employed, in which an oxidant gas (for example, air) and a fuel gas (for example, hydrogen gas) as reactant gases are humidified and supplied to the fuel cells.

When the reactant gases are humidified, water contained in the reaction gases used for the humidification may be liquefied without being absorbed in the electrolyte membrane, and may stay in the reactant gas passages. On the other hand, in the fuel cell, water is produced in the cathode electrode by the power generation reaction, while the product water diffuses back into the anode electrode via the electrolyte membrane. Consequently, at the lower end, in the direction of gravity, of the reactant gas passage, water content tends to condense and remain due to the effect of gravity, and thus flooding of the condensed water may occur.

Figure 11:
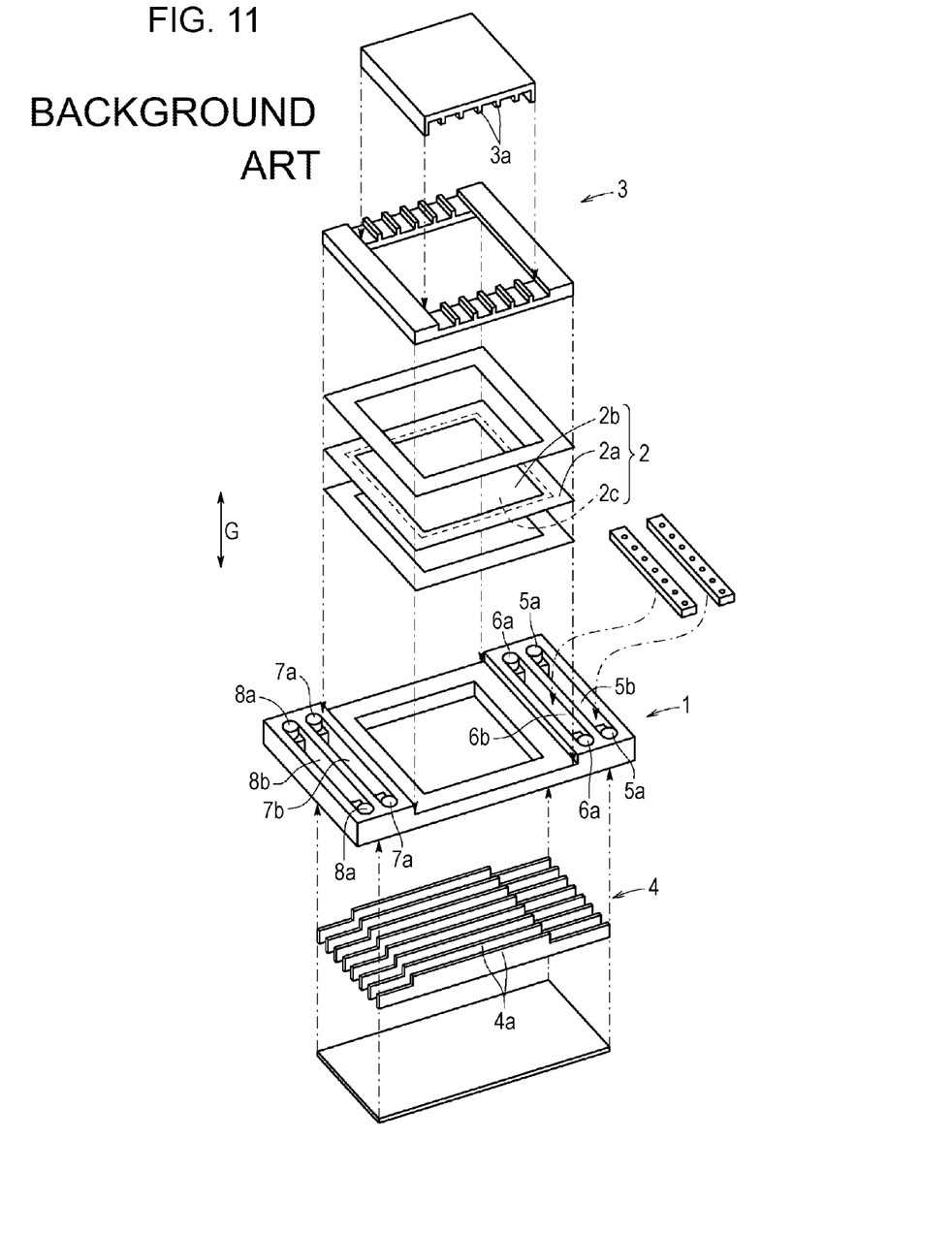
FIG. 11 is an exploded perspective view of the fuel cell disclosed in Japanese Patent No. 3123992.

As a fuel cell configured to efficiently drain product water while effectively discharging exhausted gas, there is known, for example, the solid polymer electrolyte fuel cell disclosed in Japanese Patent No. 3123992. As shown in FIG. 11, the fuel cell includes a frame 1. A cell 2 and a cathode-side passage substrate 3 are installed on one surface of the frame 1, while an anode-side passage substrate 4 is installed on the other surface of the frame 1.

The cell 2 includes a solid polymer electrolyte $2a$ which is sandwiched between a cathode $2b$ and an anode $2c$. In the cathode-side passage substrate 3, a plurality of cathode-side passages $3a$ are formed, while in the anode-side passage substrate 4, a plurality of anode-side passages $4a$ are formed.

On the upstream side of the frame 1, there are formed a pair of water supply manifold holes $5a$, a groove hole $5b$ through which the water supply manifold holes $5a$ communicate with the anode-side passages $4a$, a pair of fuel gas supply manifold holes $6a$, and a groove hole $6b$ through which the fuel gas supply manifold holes $6a$ communicate with the anode-side passages $4a$. On the downstream side of the frame 1, there are formed a pair of fuel gas discharge manifold holes $7a$, a groove hole $7b$ through which the fuel gas discharge manifold holes $7a$ communicate with the anode-side passages $4a$, a pair of water discharge manifold holes $8a$, and a groove hole $8b$ through which the water discharge manifold holes $8a$ communicate with the anode-side passages $4a$.

Then unreacted fuel gas which has passed through the anode-side passages $4a$ is discharged from the groove hole $7b$ to the outside of the battery through the fuel gas discharge manifold holes $7a$, while the water which has passed through the anode-side passages $4a$ is discharged from the groove hole $8b$ to the outside of the battery through the water discharge manifold holes $8a$.

SUMMARY OF THE INVENTION

According to one aspect of the present invention, a fuel cell includes a membrane-electrode assembly and a separator. The membrane-electrode assembly has an electrolyte and a pair of electrodes that are disposed on respective sides of the electrolyte. The membrane-electrode assembly and the separator are stacked in a stacking direction. A reaction surface of the membrane-electrode assembly is in a vertical direction along a direction of gravity and has a shape having a longer dimension in a horizontal direction. The fuel cell is provided with a reactant gas passage to allow a reactant gas to flow along a longitudinal direction of the reaction surface. The reactant gas is an oxidant gas or a fuel gas. A drain channel to allow product water from the reactant gas passage to be drained away is disposed between the membrane-electrode assembly and the separator and under the reaction surface in the direction of gravity.

According to another aspect of the present invention, a fuel cell includes a first separator and a membrane-electrode assembly. The membrane-electrode assembly has an electrolyte and a pair of electrodes disposed on respective sides of the electrolyte. The membrane-electrode assembly and the first separator are stacked in a stacking direction. The reaction surface of the membrane-electrode assembly is in a vertical direction along a direction of gravity and has a shape having a longer dimension in a horizontal direction. The reactant gas passage is to allow a reactant gas to flow along a longitudinal direction of the reaction surface. The first drain channel is provided between the membrane-electrode assembly and the first separator to allow product water from the reactant gas passage to be drained away. The first drain channel is disposed under the reaction surface in the direction of gravity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
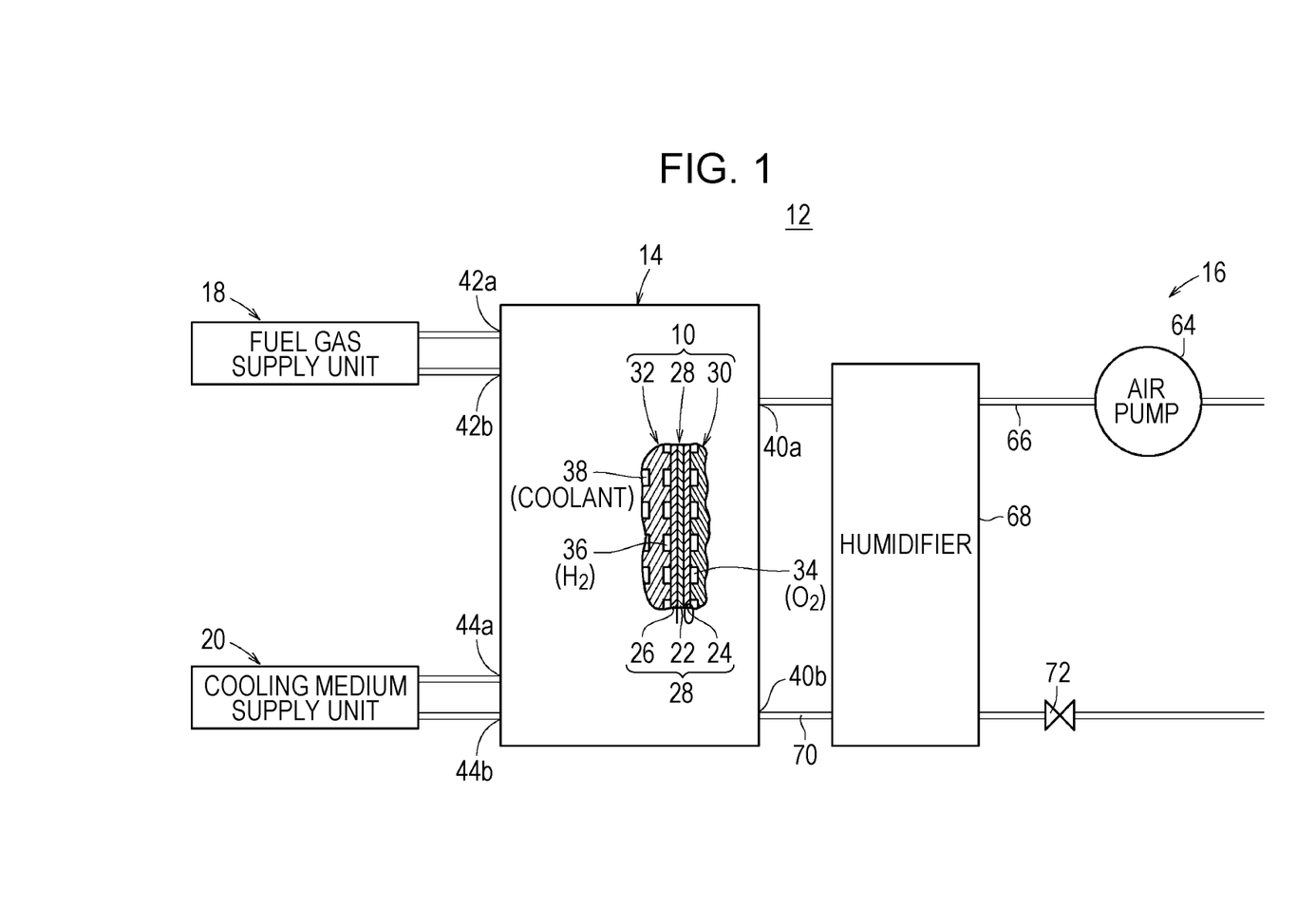
FIG. 1 is a schematic diagram of a fuel cell system which includes a fuel cell according to a first embodiment of the present invention.

As shown in FIG. 1, a fuel cell system 12 into which a fuel cell 10 according to a first embodiment of the present invention is incorporated includes a fuel cell stack 14, an oxidant gas supply unit 16 which supplies an oxidant gas to the fuel cell stack 14, a fuel gas supply unit 18 which supplies a fuel gas to the fuel cell stack 14, and a cooling medium supply unit 20 which supplies a cooling medium to the fuel cell stack 14. The fuel cell system 12 constitutes, for example, an in-vehicle fuel cell system, and is mounted in a fuel cell vehicle (fuel cell automobile), which is not shown.

Figure 2:
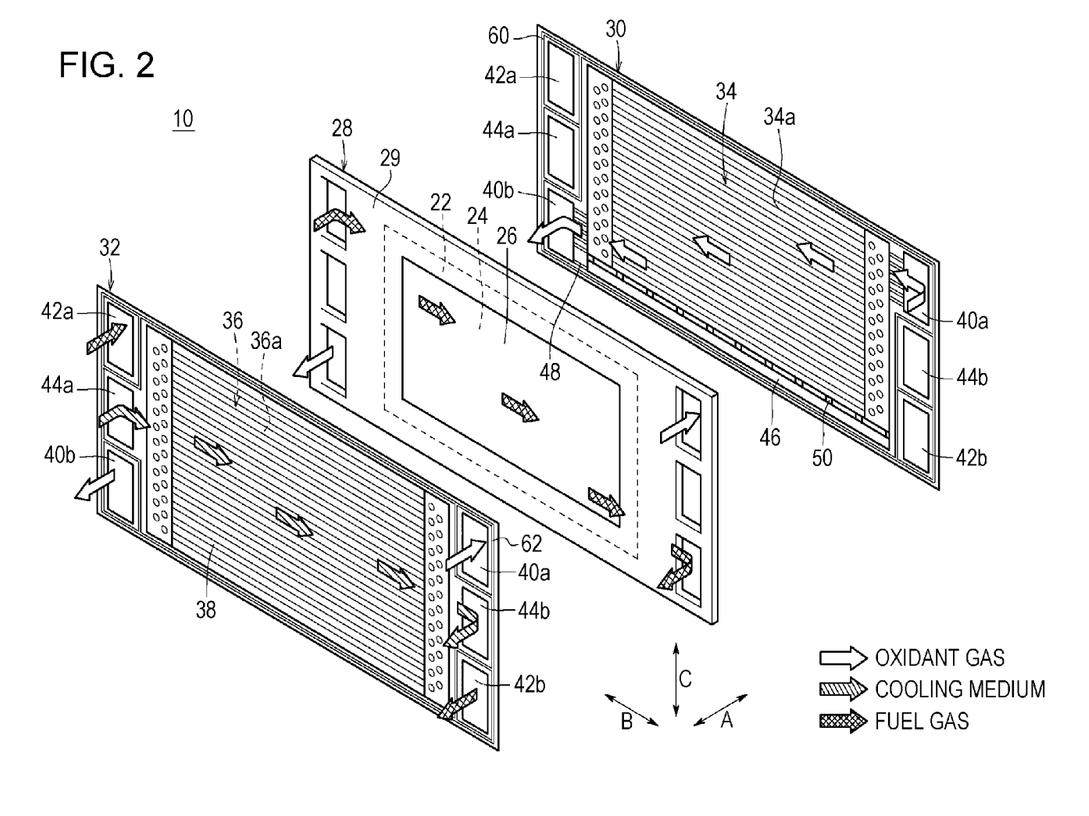
FIG. 2 is an exploded perspective view of the fuel cell.
Figure 3:
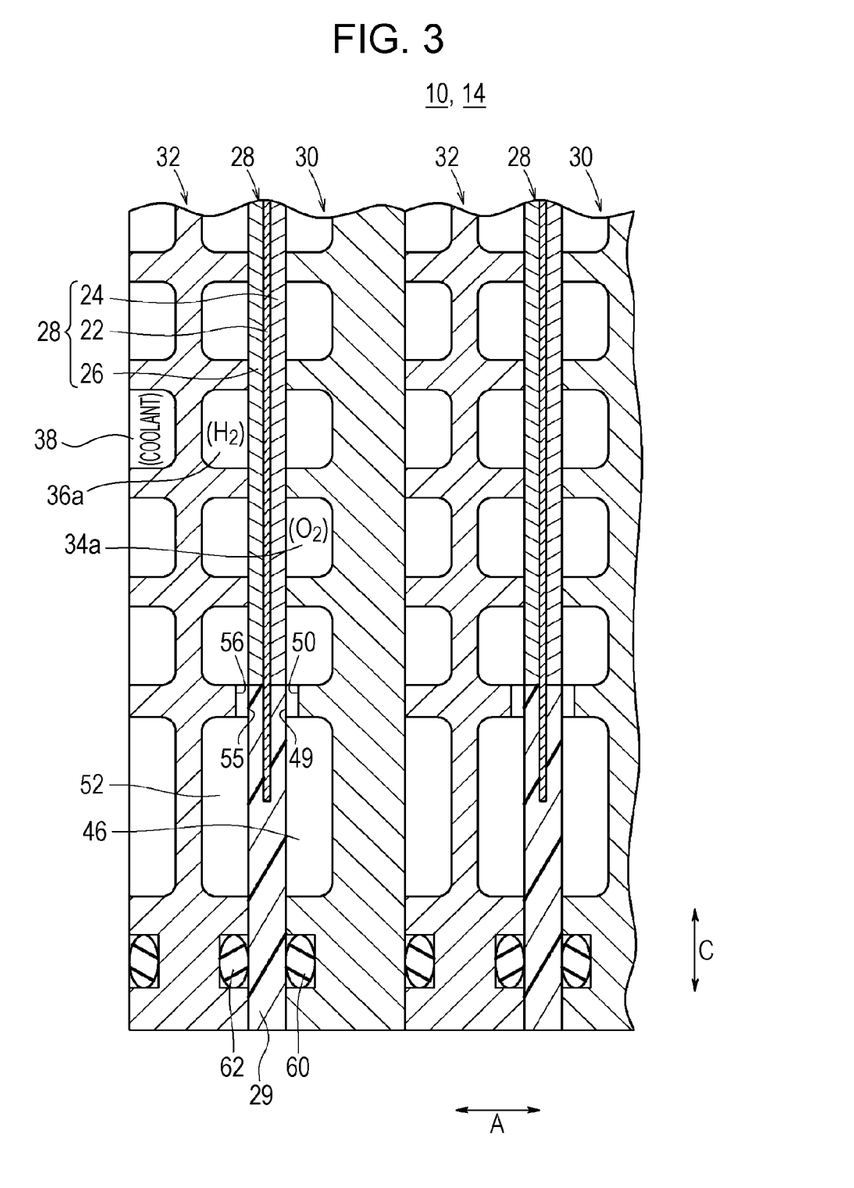
FIG. 3 is a cross-sectional view of a main part of the fuel cell.

The fuel cell stack 14 is formed by stacking a plurality of fuel cells 10. As shown in FIGS. 2 and 3, each fuel cell 10 includes, for example, a membrane-electrode assembly (MEA) 28, in which a solid polymer electrolyte membrane (electrolyte) 22 is sandwiched between a cathode electrode 24 and an anode electrode 26, the solid polymer electrolyte membrane 22 being a thin perfluoro sulfonic acid membrane impregnated with water.

The cathode electrode 24 and the anode electrode 26 have a gas diffusion layer which is formed of carbon paper or the like, and an electrode catalyst layer which is formed by uniformly coating the surface of the gas diffusion layer with porous carbon particles which carry platinum alloy (or Ru) on the surfaces thereof. The electrode catalyst layer is formed on the both sides of the solid polymer electrolyte membrane 22.

The membrane-electrode assembly 28 includes a picture-frame-shaped frame member 29 which surrounds the outer periphery of the cathode electrode 24 and the anode electrode 26. As shown in FIG. 3, the frame member 29 is formed of, for example, a resin frame, in which the edge portion of the solid polymer electrolyte membrane 22, projecting from the outer periphery of the cathode electrode 24 and the anode electrode 26 is embedded, and the frame member 29 is set to have such a thickness as to form a continuous surface with the cathode electrode 24 and the anode electrode 26. That is to say, the thickness of the entire MEA is set to be the same as that of the frame member 29, the MEA being formed by sandwiching the solid polymer electrolyte membrane 22 between the cathode electrode 24 and the anode electrode 26.

The membrane-electrode assembly 28 is arranged in an upright position so as to be parallel to the vertical direction (the direction of an arrow C), while the cathode electrode 24 and the anode electrode 26 have a vertical reaction surface, and are formed in a shape having a longer dimension in the horizontal direction (the direction of an arrow B).

The membrane-electrode assembly 28 is sandwiched between a cathode-side separator 30 and an anode-side separator 32 that have a horizontally long shape, and is stacked in the horizontal direction (the direction of an arrow A). The cathode-side separator 30 and the anode-side separator 32 are formed of, for example, a carbon separator or a metal separator.

An oxidant gas passage (reactant gas passage) 34 is provided between the cathode side separator 30 and the membrane-electrode assembly 28, while a fuel gas passage (reactant gas passage) 36 is provided between the anode-side separator 32 and the membrane-electrode assembly 28. A cooling medium passage 38 is provided between the cathode-side separator 30 and the anode-side separator 32.

Figure 4:
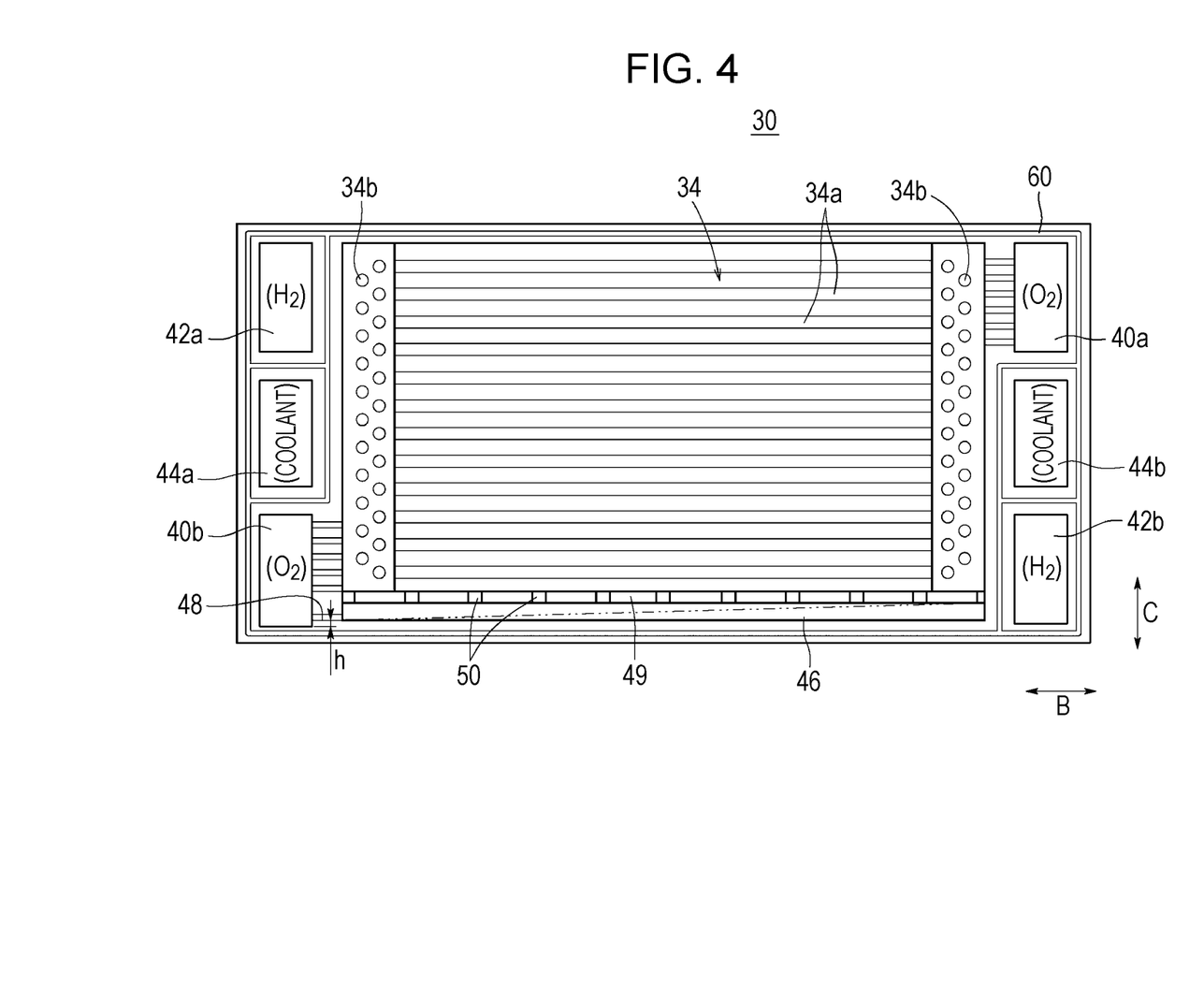
FIG. 4 is an elevation view of a cathode-side separator which constitutes the fuel cell.
Figure 5:
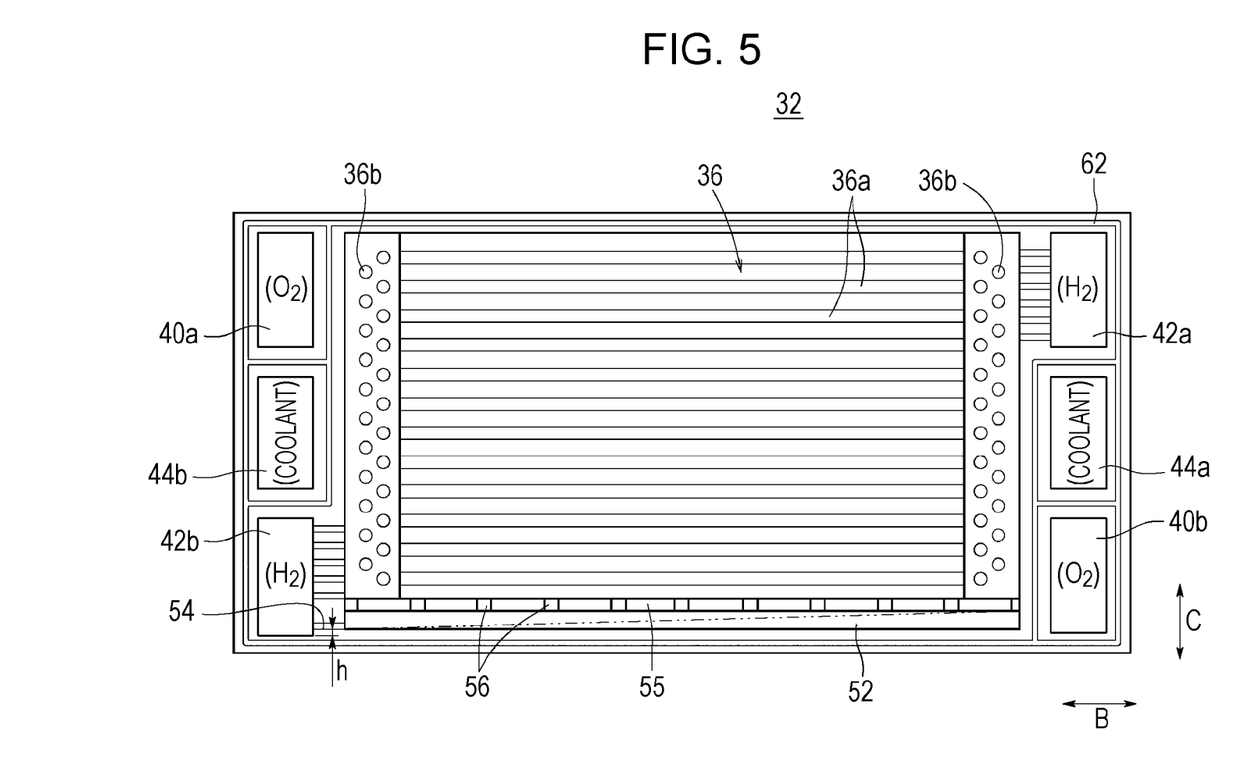
FIG. 5 is an elevation view of an anode-side separator which constitutes the fuel cell.

As shown in FIGS. 2 and 4, the oxidant gas passage 34 has a plurality of passage grooves 34a that allow an oxidant gas to flow in the longitudinal direction (the direction of the arrow B) of the reaction surface. Both ends of the passage grooves 34a in the flow direction are provided with buffer portions 34b. Similarly, as shown in FIG. 5, the fuel gas passage 36 has a plurality of passage grooves 36a that allow a fuel gas to flow in the longitudinal direction (the direction of the arrow B) of the reaction surface. Both ends of the passage grooves 36a in the flow direction are provided with buffer portions 36b.

As shown in FIG. 2, the fuel cell 10 is provided with an oxidant gas supply communication hole (reactant gas supply communication hole) 40a that supplies an oxidant gas, for example, an oxygen containing gas (hereinafter also referred to as air), a fuel gas supply communication hole (reactant gas supply communication hole) 42a that supplies a fuel gas, for example, a hydrogen containing gas (hereinafter also referred to as hydrogen gas), a cooling medium supply communication hole 44a that supplies cooling medium, an oxidant gas discharge communication hole (reactant gas discharge communication hole) 40b to discharge the oxidant gas, a fuel gas discharge communication hole (reactant gas discharge communication hole) 42b to discharge the fuel gas, and a cooling medium discharge communication hole 44b to discharge the cooling medium that communicate with all the fuel cells 10 in the stacking direction.

The oxidant gas supply communication hole 40a is disposed at the upper corner of one end side in the longitudinal direction (the direction of the arrow B) of the fuel cell 10, while the fuel gas supply communication hole 42a is disposed at the upper corner of the other end side in the longitudinal direction of the fuel cell 10. The oxidant gas discharge communication hole 40b is disposed at the lower corner of the other end side in the longitudinal direction of the fuel cell 10, while the fuel gas discharge communication hole 42b is disposed at the lower corner of one end side in the longitudinal direction of the fuel cell 10. The cooling medium supply communication hole 44a is disposed in the middle of the other end side in the longitudinal direction of the fuel cell 10, while the cooling medium discharge communication hole 44b is disposed in the middle of one end side in the longitudinal direction of the fuel cell 10.

As shown in FIGS. 3 and 4, the cathode-side separator 30 is provided with a cathode-side drain channel (a drain channel on one side) 46 to discharge product water from the oxidant gas passage 34, the cathode-side drain channel being located between the membrane-electrode assembly 28 and the cathode-side separator 30, and under the reaction surface in the direction of gravity, i.e., below the lower end of the oxidant gas passage 34.

The cathode-side drain channel 46 is disposed in the surface of the cathode-side separator 30 so as to extend in the longer side direction (the direction of the arrow B), and the cathode-side drain channel 46 and the oxidant gas discharge communication hole 40b are connected via a drain passage 48. The bottom surface of the oxidant gas discharge communication hole 40b is disposed lower than the cathode-side drain channel 46 by a distance h. By inclining the bottom surface of the cathode-side drain channel 46 so as to have a downward slope toward the drain passage 48 (see the chain double-dashed line in FIG. 4), the drainage function may be further improved.

In the cathode-side separator 30, a plurality of communication grooves 50 are formed by cutting out portions of a connection region 49 where a passage groove 34a that is located lowest in the direction of gravity, and the cathode-side drain channel 46 are connected to each other. In the membrane-electrode assembly 28, the frame member 29 is disposed at least part of the connection region 49.

As shown in FIGS. 3 and 5, the anode-side separator 32 is provided with an anode-side drain channel (a drain channel on the other side) 52 to discharge product water from the fuel gas passage 36, the anode-side drain channel being located between the membrane-electrode assembly 28 and the anode-side separator 32, and under the reaction surface in the direction of gravity, i.e., below the lower end of the fuel gas passage 36.

The anode-side drain channel 52 is disposed in the surface of the anode-side separator 32 so as to extend in the longer side direction (the direction of the arrow B), and the anode-side drain channel 52 and the fuel gas discharge communication hole 42b are connected via a drain passage 54. By inclining the bottom face of the anode-side drain channel 52 so as to have a downward slope toward the drain passage 54 (see the chain double-dashed line in FIG. 5), the drainage function may be further improved.

In the anode-side separator 32, a plurality of communication grooves 56 are formed by cutting out portions of a connection region 55 where a passage groove 36a that is located lowest in the direction of gravity, and the anode-side drain channel 52 are connected to each other. In the membrane-electrode assembly 28, the frame member 29 is disposed at least part of the connection region 55.

As shown in FIG. 2, in the cathode-side separator 30, a first seal member 60 is integrally or separately provided, while in the anode-side separator 32, the second seal member 62 is integrally or separately provided. As the material for the first seal member 60 and the second seal member 62, a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber is used.

As shown in FIG. 1, the oxidant gas supply unit 16 is provided with an air pump 64 to compress and supply air from the atmosphere, which is disposed in the air supply passage 66. In the air supply passage 66, there is disposed a humidifier 68 to exchange water and heat between a supply gas (supply air) and a discharge gas (discharge air), while the air supply passage 66 communicates with the oxidant gas supply communication hole 40a of the fuel cell stack 14.

The oxidant gas supply unit 16 is provided with an air discharge passage 70 that communicates with the oxidant gas discharge communication hole 40b. The air discharge passage 70 communicates with the humidifying medium passage (not shown) of the humidifier 68, and is provided with an opening ratio-adjustable back pressure control valve 72 to adjust the pressure of the air supplied from the air pump 64 to the fuel cell stack 14 through the air supply passage 66.

The fuel gas supply unit 18 is provided with a hydrogen tank (not shown) that stores high pressure hydrogen. The fuel gas supply unit 18 supplies hydrogen from the hydrogen tank to the fuel cell stack 14, and circulates a discharge gas and supplies it again as a fuel gas to the fuel cell stack 14, the discharge gas including the hydrogen gas that has not been used in the fuel cell stack 14 power generations.

The cooling medium supply unit 20 includes a coolant pump and a radiator (not shown) to circulate a cooling medium through the fuel cell stack 14.

The operation of the fuel cell 10 configured in this manner is described below.

As shown in FIG. 1, air is supplied to the air supply passage 66 via the air pump 64 that constitutes the oxidant gas supply unit 16. The air is humidified by the humidifier 68 while being passed therethrough, and then is supplied to the oxidant gas supply communication hole 40a of the fuel cell stack 14. As shown in FIG. 2, the humidified air is supplied to the cathode electrode 24 while being moved horizontally along the oxidant gas passage 34 provided in each fuel cell 10 within the fuel cell stack 14.

As shown in FIG. 1, exhausted air is discharged into the air discharge passage 70 through the oxidant gas discharge communication hole 40b, and is sent to the humidifier 68. Thus, after humidifying the air to be supplied as a humidifying medium subsequently, the exhausted air is discharged outside via the back pressure control valve 72.

On the other hand, the hydrogen gas supplied from the fuel gas supply unit 18 is supplied to the fuel gas supply communication hole 42a of the fuel cell stack 14. The hydrogen gas supplied into the fuel cell stack 14 is supplied to the anode electrode 26 while being moved horizontally along the fuel gas passage 36 of each fuel cell 10 (see FIG. 2).

Exhausted hydrogen gas is discharged from the fuel gas discharge communication hole 42b, while water on the cathode electrode 24 side permeates to the anode electrode 26 side via the solid polymer electrolyte membrane 22, and the fuel gas humidified by the water is supplied again to the fuel cell stack 14. Consequently, the air supplied to the cathode electrode 24 reacts with the hydrogen gas supplied to the anode electrode 26, and thus electric power is generated.

In addition, a cooling medium is introduced into the fuel cell stack 14 by the cooling medium supply unit 20. The cooling medium cools the fuel cell 10 while moving horizontally along the cooling medium passage 38, and then returns from the cooling medium discharge communication hole 44b.

When power is generated by each fuel cell 10 in the fuel cell stack 14 in the above manner, water is produced in the oxidant gas passage 34 by the power generation reaction. The oxidant gas passage 34 is formed with the longer side in the horizontal direction, and the product water moves in the direction of gravity on the way through the oxidant gas passage 34, and thus tends to remain in the vertically lower portion of the reaction surface.

To prevent such a case, in the first embodiment, as shown in FIGS. 3 and 4, the cathode-side separator 30 is provided with the cathode-side drain channel 46, which is located between the membrane-electrode assembly 28 and the cathode-side separator 30, and is below the lower end of the oxidant gas passage 34. Therefore, the product water which has moved to the lower end of the oxidant gas passage 34 is stored in the cathode-side drain channel 46 through a plurality of communication grooves 50, and then is discharged into the oxidant gas discharge communication hole 40b via the drain passage 48. Similarly to the discharged air, the product water is further discharged into the air discharge passage 70, which is outside the fuel cell stack 14.

Thus, in the first embodiment, with a simple configuration, the product water which tends to remain in the lower portion of the reaction surface in the direction of gravity may be easily and securely discharged from the reaction surface. Consequently, the fuel cell 10 provides the effect that the most suitable environment for power generation may be favorably maintained.

On the other hand, there is produced water in the fuel gas passage 36, that is diffused back from the oxidant gas passage 34 through the solid polymer electrolyte membrane 22. The product water moves in the direction of gravity on the way through the fuel gas passage 36, and thus tends to remain in the vertically lower portion of the reaction surface.

Here, as shown in FIGS. 3 and 5, the anode-side separator 32 is provided with the anode-side drain channel 52, which is located between the membrane-electrode assembly 28 and the anode-side separator 32, and is below the lower end of the fuel gas passage 36. Therefore, the product water which has moved to the lower end of the fuel gas passage 36 is stored in the anode-side drain channel 52 through a plurality of communication grooves 56, and then is discharged into the fuel gas discharge communication hole 42b via the drain passage 54. Similarly to the discharged hydrogen gas, the product water is further discharged to the outside of the fuel cell stack 14.

Figure 6:
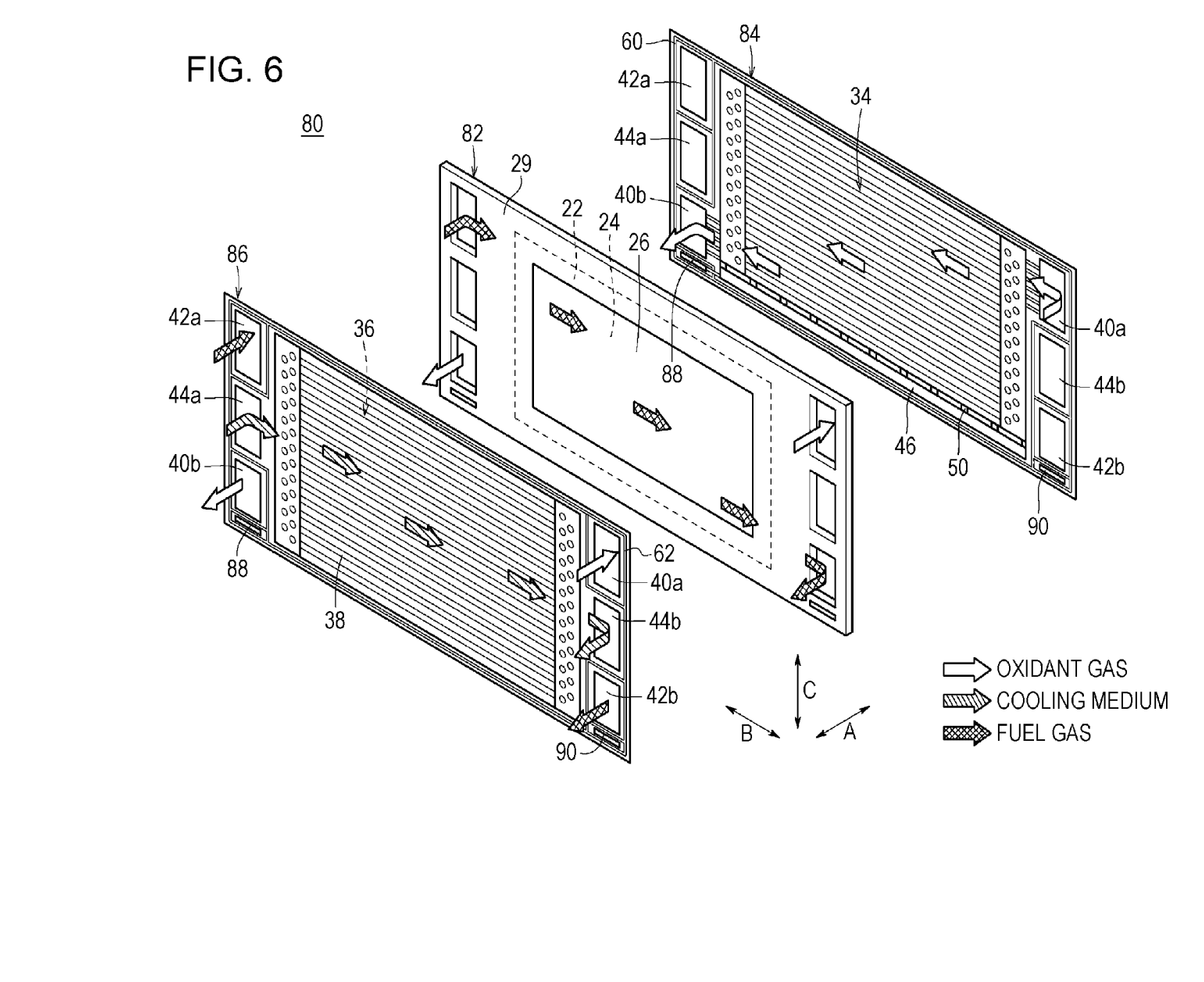
FIG. 6 is an exploded perspective view of a fuel cell according to a second embodiment of the present invention.

FIG. 6 is an exploded perspective view of a fuel cell 80 according to a second embodiment of the present invention.

The same components as those of the fuel cell 10 according to the first embodiment are labeled with the same reference symbols, and detailed description is omitted. Similarly, in a third embodiment described below, detailed description is omitted.

In the fuel cell 80, a membrane-electrode assembly 82 is sandwiched between a cathode-side separator 84 and an anode-side separator 86. The fuel cell 80 is provided with a cathode-side drain communication hole 88 which is adjacent to the lower side of the oxidant gas discharge communication hole 40b, and is formed as a through hole in the stacking direction (the direction of the arrow A) as well as an anode-side drain communication hole 90 which is adjacent to the lower side of the fuel gas discharge communication hole 42b, and is formed as a through hole in the stacking direction.

Figure 7:
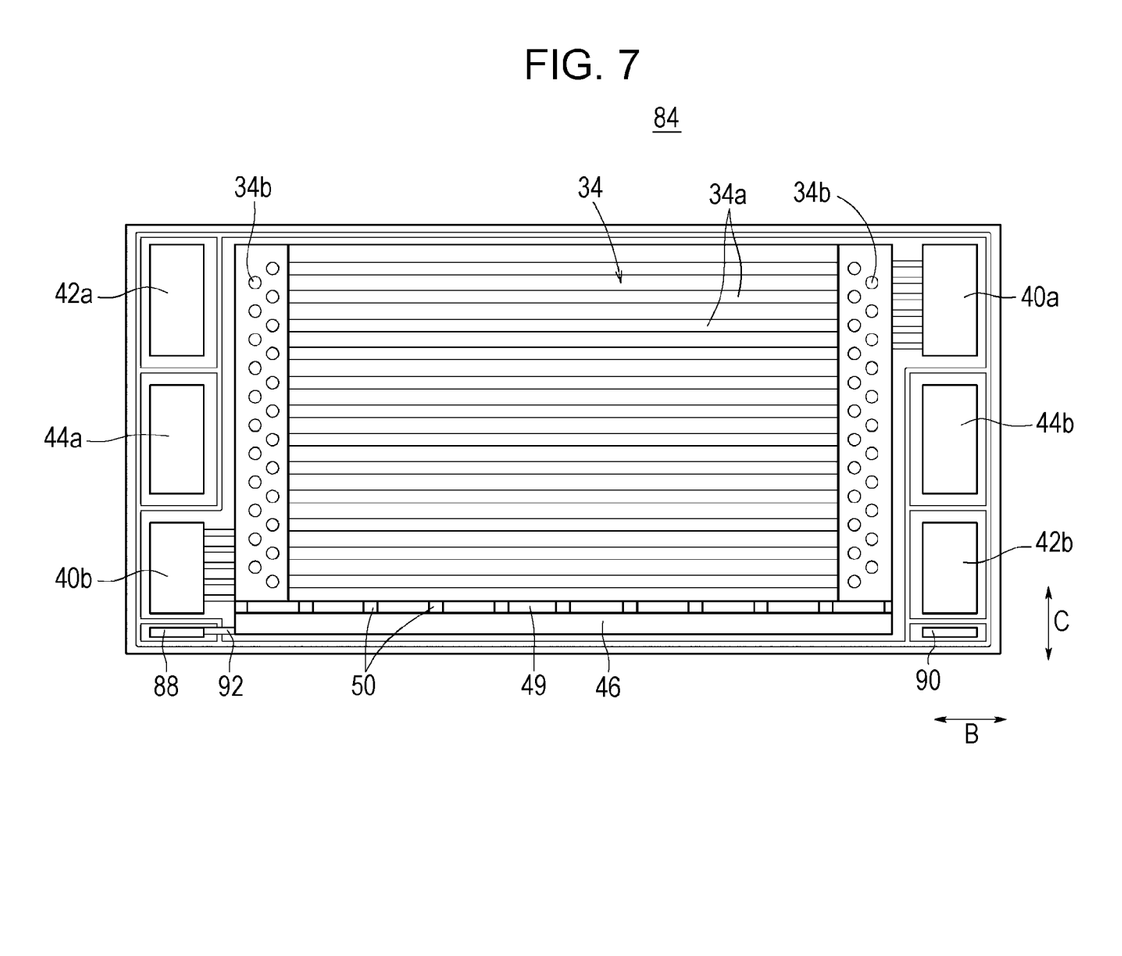
FIG. 7 is an elevation view of a cathode-side separator which constitutes the fuel cell.

As shown in FIG. 7, the cathode-side separator 84 is provided with the cathode-side drain channel 46, while the cathode-side drain channel 46 and the cathode-side drain communication hole 88 communicate with each other via a drain passage 92.

Figure 8:
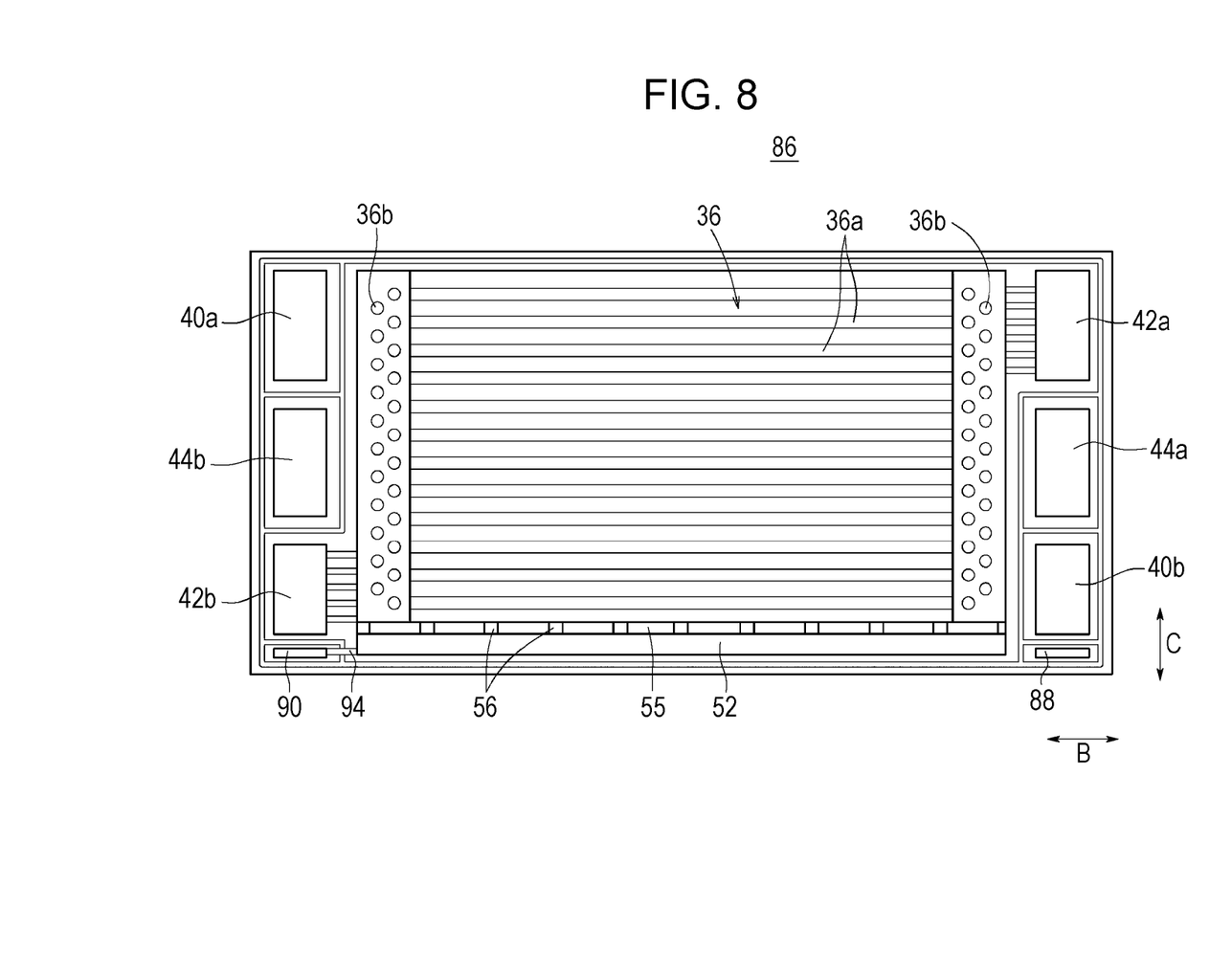
FIG. 8 is an elevation view of an anode-side separator which constitutes the fuel cell.

As shown in FIG. 8, the anode-side separator 86 is provided with the anode-side drain channel 52, while the anode-side drain channel 52 and the anode-side drain communication hole 90 communicate with each other via a drain passage 94. The bottom face of the cathode-side drain communication hole 88 is preferably located below the cathode-side drain channel 46, and the bottom face of the anode-side drain communication hole 90 is preferably located below the anode-side drain channel 52. The bottom face of either one of the cathode-side drain communication hole 88 and the anode-side drain communication hole 90 may be located below the corresponding groove.

In the second embodiment configured in this manner, the dedicated cathode-side drain communication hole 88 is provided to drain water from the oxidant gas passage 34, and the dedicated anode-side drain communication hole 90 is provided to drain water from the fuel gas passage 36. Accordingly, the effect that drain treatment is performed separately on each side is obtained along with similar effects to those of the first embodiment.

Figure 9:
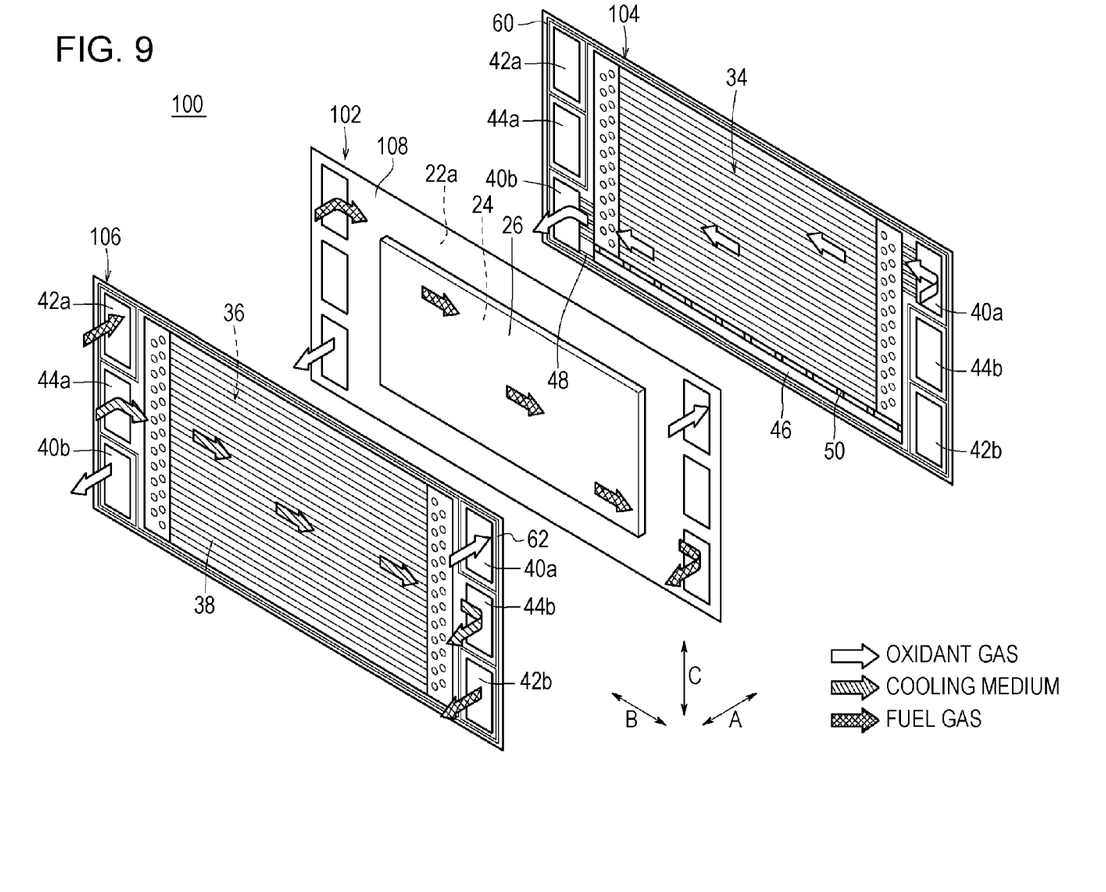
FIG. 9 is an exploded perspective view of a fuel cell according to a third embodiment of the present invention.

FIG. 9 is an exploded perspective view of a fuel cell 100 according to the third embodiment of the present invention.

Figure 10:
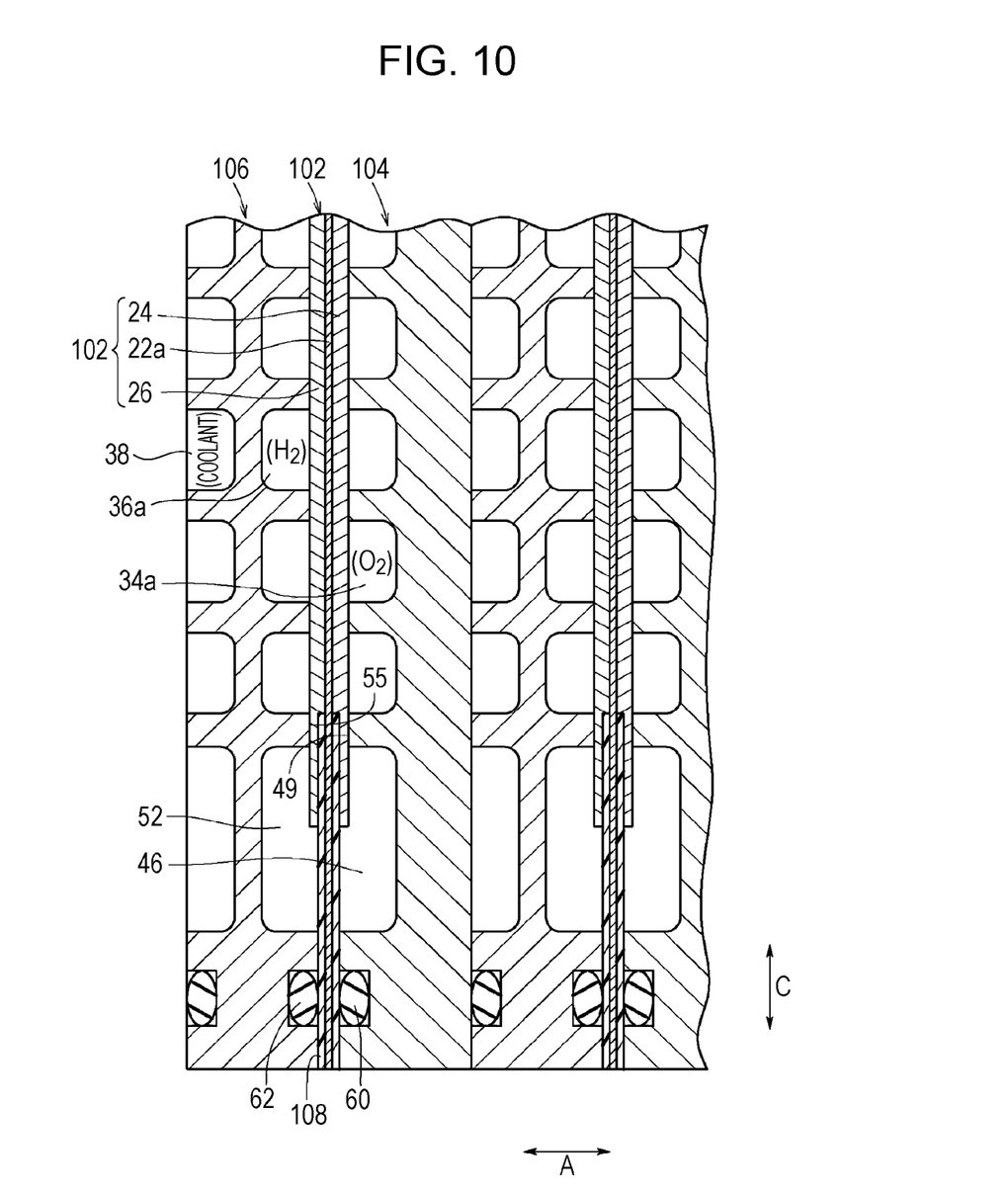
FIG. 10 is a cross-sectional view of a main part of the fuel cell.

In the fuel cell 100, a membrane-electrode assembly 102 is sandwiched between a cathode-side separator 104 and an anode-side separator 106. As shown in FIG. 10, the membrane-electrode assembly 102 includes a solid polymer electrolyte membrane 22a, which has the same outer dimension as that of the cathode-side separator 104 and the anode-side separator 106.

The outer peripheral edge of the solid polymer electrolyte membrane 22a is provided with a protective film (frame member) 108 by overlapping with the respective portion of the outer peripheral edges of the cathode-side separator 104 and the anode-side separator 106.

The cathode-side separator 104 and the anode-side separator 106 are provided with connection regions 49 and 55, respectively, which are not provided with a communication groove. In the membrane-electrode assembly 102, the cathode electrode 24 and the anode electrode 26 each having a porous gas diffusion layer are arranged in the connection regions 49, 55, and thus product water may be discharged via the porous gas diffusion layer without having a communication groove.

In the third embodiment configured in this manner, the connection regions 49, 55 are not each provided with a communication groove, and thus the effect that the configuration is further simplified is obtained along with similar effects to those of the first embodiment.

A fuel cell according to the embodiment includes a membrane-electrode assembly having an electrolyte and a pair of electrodes that are disposed on respective sides of the electrolyte, and a separator, where the membrane-electrode assembly and the separator are stacked in the horizontal direction, the reaction surface is in the vertical direction in the direction of gravity and is in a shape having its longer dimension in the horizontal direction, and the fuel cell is provided with a reactant gas passage configured to allow a reactant gas to flow along the longitudinal direction of the reaction surface, the reactant gas being an oxidant gas or a fuel gas.

The fuel cell is provided with a drain channel configured to allow product water from the reactant gas passage to drain is disposed between the membrane-electrode assembly and the separator and under the reaction surface in the direction of gravity. The water that has moved under the reaction surface in the direction of gravity is stored in the discharge groove and is discharged to the outside of the fuel cell. Accordingly, with a simple configuration, the product water which tends to remain in the lower portion of the reaction surface in the direction of gravity may be easily and securely discharged from the reaction surface. Consequently, the fuel cell can favorably maintain the most suitable power generating environment.

In addition, in the fuel cell, an oxidant gas passage and one drain channel are preferably formed between one separator and one surface of the membrane-electrode assembly, the oxidant gas passage being the reactant gas passage configured to allow the oxidant gas to flow in the longitudinal direction of the reaction surface, and the one drain channel being located under the oxidant gas passage in the direction of gravity, and configured to allow product water to discharge from the oxidant gas passage, while a fuel gas passage and the other drain channel are preferably formed between the other separator and the other surface of the membrane-electrode assembly, the fuel gas passage being the reactant gas passage configured to allow the fuel gas to flow in the longitudinal direction of the reaction surface, and the other drain channel being located under the fuel gas passage in the direction of gravity, and configured to allow product water to discharge from the fuel gas passage.

Furthermore, in the fuel cell, the membrane-electrode assembly preferably includes a picture-frame-shaped frame member that surrounds an outer periphery of the electrode, the end of the frame member on the electrode side is preferably disposed at a connection region between the lower end of the reactant gas passage and the drain channel, and a communication groove is preferably formed in the separator by cutting out the connection region, the communication groove allowing the reactant gas passage to communicate with the drain channel.

Furthermore, in the fuel cell, the fuel cell preferably includes a reactant gas outlet communication hole which communicates with an outlet of the reactant gas passage, and is formed as a through hole in the stacking direction of the membrane-electrode assembly and the separator, and a drain passage is preferably disposed, via which the drain channel and the reactant gas outlet communication hole communicate with each other.

Furthermore, in the fuel cell, the fuel cell preferably includes a reactant gas outlet communication hole which communicates with an outlet of the reactant gas passage, and is formed as a through hole in the stacking direction of the membrane-electrode assembly and the separator, and a drain communication hole which is adjacent to the lower side of the reactant gas outlet communication hole and is preferably formed as a through hole in the stacking direction, and communicates with the drain channel.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane-electrode assembly having an electrolyte and a pair of electrodes that are disposed on respective sides of the electrolyte; and
   a separator, wherein
   the membrane-electrode assembly and the separator are stacked in a stacking direction,
   a reaction surface of the membrane-electrode assembly is in a vertical direction along a direction of gravity and has a shape having a longer dimension in a horizontal direction,
   the fuel cell is provided with a reactant gas passage to allow a reactant gas to flow along a longitudinal direction of the reaction surface, the reactant gas being an oxidant gas or a fuel gas,
   a drain channel to allow product water from the reactant gas passage to be drained away is disposed between the membrane-electrode assembly and the separator; and
   a communication groove provided between the membrane-electrode assembly and the separator to connect the reactant gas passage to the drain channel,
   wherein the drain channel is an elongated passage that longitudinally extends in the horizontal direction, and
   wherein the reaction surface is located above and overlaps with the drain channel when viewed in the direction of gravity.

2. The fuel cell according to claim 1,
   wherein an oxidant gas passage and one drain channel are provided between one separator and one surface of the membrane-electrode assembly, the oxidant gas passage being the reactant gas passage to allow the oxidant gas to flow in the longitudinal direction of the reaction surface, the one drain channel being located under the oxidant gas passage in the direction of gravity to allow product water to be discharged from the oxidant gas passage, and
   wherein a fuel gas passage and another drain channel are provided between other separator and other surface of the membrane-electrode assembly, the fuel gas passage being the reactant gas passage to allow the fuel gas to flow in the longitudinal direction of the reaction surface, the other drain channel being located under the fuel gas passage in the direction of gravity to allow product water to be discharged from the fuel gas passage.

3. The fuel cell according to claim 1,
   wherein the membrane-electrode assembly includes a picture-frame-shaped frame member that surrounds an outer periphery of the electrode,
   wherein an end of the frame member on an electrode side is disposed at a connection region between a lower end of the reactant gas passage and the drain channel, and
   wherein the communication groove is provided in the separator by cutting out a portion of the connection region.

4. The fuel cell according to claim 1,
   wherein a reactant gas outlet communication hole communicates with an outlet of the reactant gas passage and is provided as a through hole in the stacking direction of the membrane-electrode assembly and the separator, and
   wherein a drain passage is disposed so that the drain channel and the reactant gas outlet communication hole communicate with each other.

5. The fuel cell according to claim 1,
   wherein a reactant gas outlet communication hole communicates with an outlet of the reactant gas passage and is provided as a through hole in the stacking direction of the membrane-electrode assembly and the separator, and
   wherein a drain communication hole is adjacent to a lower side of the reactant gas outlet communication hole and is provided as a through hole in the stacking direction, the drain communication hole communicating with the drain channel.

6. A fuel cell comprising:
   a first separator; and
   a membrane-electrode assembly having an electrolyte and a pair of electrodes disposed on respective sides of the electrolyte, the membrane-electrode assembly and the first separator being stacked in a stacking direction, a reaction surface of the membrane-electrode assembly being in a vertical direction along a direction of gravity and having a shape having a longer dimension in a horizontal direction,
   wherein a reactant gas passage is provided to allow a reactant gas to flow along a longitudinal direction of the reaction surface,
   wherein a first drain channel is provided between the membrane-electrode assembly and the first separator to allow product water from the reactant gas passage to be drained away,
   wherein a communication groove is provided between the membrane-electrode assembly and the first separator to connect the reactant gas passage to the first drain channel,
   wherein the first drain channel is an elongated passage that longitudinally extends in the horizontal direction, and wherein the reaction surface is located above and overlaps with the first drain channel when viewed in the direction of gravity.

7. The fuel cell according to claim 6, further comprising:
a second separator,
wherein a second drain channel is provided between the membrane-electrode assembly and the second separator to allow product water from the reactant gas passage to be drained away,
wherein the reactant gas passage includes an oxidant gas passage to allow an oxidant gas to flow in the longitudinal direction of the reaction surface, and a fuel gas passage to allow a fuel gas to flow in the longitudinal direction of the reaction surface,
wherein the oxidant gas passage and the first drain channel are provided between the first separator and a first surface of the membrane-electrode assembly, the first drain channel being provided under the oxidant gas passage in the direction of gravity to allow product water to be discharged from the oxidant gas passage, and
wherein the fuel gas passage and the second drain channel are provided between the second separator and a second surface of the membrane-electrode assembly, the second drain channel being provided under the fuel gas passage in the direction of gravity to allow product water to be discharged from the fuel gas passage.

8. The fuel cell according to claim 6,
wherein the membrane-electrode assembly further has a frame member having a picture-frame-shape and surrounding an outer periphery of the electrode, an end of the frame member on an electrode side being disposed at a connection region provided between a lower end of the reactant gas passage and the first drain channel, and
wherein the communication groove is provided by cutting out a portion of the connection region.

9. The fuel cell according to claim 6,
wherein the first separator includes a first reactant gas outlet communication hole communicating with an outlet of the reactant gas passage and provided as a through hole in the stacking direction, and
wherein a first drain passage is provided between the membrane-electrode assembly and the first separator to communicate the first drain channel to the first reactant gas outlet communication hole.

10. The fuel cell according to claim 6,
wherein the first separator includes a first reactant gas outlet communication hole communicating with an outlet of the reactant gas passage and provided as a through hole in the stacking direction, and
wherein a first drain communication hole is adjacent to a lower side of the reactant gas outlet communication hole and is provided as a through hole in the stacking direction, the first drain communication hole communicating with the first drain channel.

11. The fuel cell according to claim 7,
wherein the first separator includes a first reactant gas outlet communication hole communicating with an outlet of the reactant gas passage and provided as a through hole in the stacking direction, and
wherein a first drain passage is provided between the membrane-electrode assembly and the first separator to communicate the first drain channel to the first reactant gas outlet communication hole.

12. The fuel cell according to claim 11,
wherein the second separator includes a second reactant gas outlet communication hole communicating with an outlet of the reactant gas passage and provided as a through hole in the stacking direction, and
wherein a second drain passage is provided between the membrane-electrode assembly and the second separator to communicate the second drain channel to the second reactant gas outlet communication hole.

13. The fuel cell according to claim 7,
wherein the first separator includes a first reactant gas outlet communication hole communicating with an outlet of the reactant gas passage and provided as a through hole in the stacking direction, and
wherein a first drain communication hole is adjacent to a lower side of the reactant gas outlet communication hole and is provided as a through hole in the stacking direction, the first drain communication hole communicating with the first drain channel.

14. The fuel cell according to claim 13,
wherein the second separator includes a second reactant gas outlet communication hole communicating with an outlet of the reactant gas passage and provided as a through hole in the stacking direction, and
wherein a second drain communication hole is adjacent to the lower side of the reactant gas outlet communication hole and is provided as a through hole in the stacking direction, the second drain communication hole communicating with the second drain channel.

15. The fuel cell according to claim 1,
wherein the reaction surface of the membrane-electrode assembly extends along a vertically orientated plane,
wherein the reactant gas passage longitudinally extends in the horizontal direction along and in direct contact with the reaction surface, the reactant gas passage being provided between the membrane-electrode assembly and the separator,
wherein the drain channel longitudinally extends in the horizontal direction beneath and substantially parallel to the reactant gas passage, and
wherein the communication groove extends in the vertical direction and directly connects the reactant gas passage to the drain channel.

16. The fuel cell according to claim 1,
wherein the reactant gas passage longitudinally extends in the horizontal direction along and in direct contact with the reaction surface, the reactant gas passage being provided between the membrane-electrode assembly and the separator, and
wherein the drain channel longitudinally extends in the horizontal direction beneath and substantially parallel to the reactant gas passage.

17. The fuel cell according to claim 1,
wherein the communication groove extends in the vertical direction and directly connects the reactant gas passage to the drain channel.

18. The fuel cell according to claim 6,
wherein the reaction surface of the membrane-electrode assembly extends along a vertically orientated plane,
wherein the reactant gas passage longitudinally extends in the horizontal direction along and in direct contact with the reaction surface, the reactant gas passage being provided between the membrane-electrode assembly and the first separator,
wherein the first drain channel longitudinally extends in the horizontal direction beneath and substantially parallel to the reactant gas passage, and
wherein the communication groove extends in the vertical direction and directly connects the reactant gas passage to the first drain channel.

19. The fuel cell according to claim 6,
wherein the reactant gas passage longitudinally extends in the horizontal direction along and in direct contact with the reaction surface, the reactant gas passage being provided between the membrane-electrode assembly and the first separator, and
wherein the first drain channel longitudinally extends in the horizontal direction beneath and substantially parallel to the reactant gas passage.

20. The fuel cell according to claim 6,
wherein the communication groove extends in the vertical direction and directly connects the reactant gas passage to the first drain channel.

* * * * *